United States Patent
Spohrer et al.

(10) Patent No.: US 7,633,930 B2
(45) Date of Patent: Dec. 15, 2009

(54) SYSTEMS AND METHODS FOR CAPTURING MULTIMEDIA COMMUNICATION SIGNALS

(75) Inventors: Dan Spohrer, Alpharetta, GA (US); Thomas Z. Dong, Marietta, GA (US)

(73) Assignee: Verint Americas Inc., Melville, NY (US)

( * ) Notice: Subject to any disclaimer, the term of this patent is extended or adjusted under 35 U.S.C. 154(b) by 644 days.

(21) Appl. No.: 11/396,061

(22) Filed: Mar. 31, 2006

(65) Prior Publication Data

US 2007/0230345 A1 Oct. 4, 2007

(51) Int. Cl.
*H04L 12/66* (2006.01)
*H04M 3/00* (2006.01)

(52) U.S. Cl. .................................. 370/352; 379/265.06
(58) Field of Classification Search ........................ None
See application file for complete search history.

(56) References Cited

U.S. PATENT DOCUMENTS

| | | | |
|---|---|---|---|
| 3,594,919 A | 7/1971 | De Bell et al. |
| 3,705,271 A | 12/1972 | De Bell et al. |
| 4,510,351 A | 4/1985 | Costello et al. |
| 4,684,349 A | 8/1987 | Ferguson et al. |
| 4,694,483 A | 9/1987 | Cheung |
| 4,763,353 A | 8/1988 | Canale et al. |
| 4,815,120 A | 3/1989 | Kosich |
| 4,924,488 A | 5/1990 | Kosich |
| 4,953,159 A | 8/1990 | Hayden et al. |
| 5,016,272 A | 5/1991 | Stubbs et al. |
| 5,101,402 A | 3/1992 | Chiu et al. |
| 5,117,225 A | 5/1992 | Wang |
| 5,210,789 A | 5/1993 | Jeffus et al. |
| 5,239,460 A | 8/1993 | LaRoche |
| 5,241,625 A | 8/1993 | Epard et al. |
| 5,267,865 A | 12/1993 | Lee et al. |
| 5,299,260 A | 3/1994 | Shaio |
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |

(Continued)

FOREIGN PATENT DOCUMENTS

EP 0453128 A2 10/1991

(Continued)

OTHER PUBLICATIONS

"Customer Spotlight: Navistar International," Web pae, unverified print date of Apr. 1, 2002.

(Continued)

*Primary Examiner*—Ricky Ngo
*Assistant Examiner*—Clemence Han
(74) *Attorney, Agent, or Firm*—Lawrence A. Aaronson, P.C.

(57) ABSTRACT

Systems and methods for capturing communication signals are provided. An exemplary method comprises the steps of: receiving communication signals of various types; determining whether to record the received communication signals; responsive to determining that the received communication signals are to be recorded, determining types of communication signals associated with the received communication signals; responsive to determining the types of communication signals, determining multiple interfaces that facilitate recording of the communication signals; and recording the communication signals via the corresponding multiple interfaces.

7 Claims, 13 Drawing Sheets

U.S. PATENT DOCUMENTS

| | | |
|---|---|---|
| 5,388,252 A | 2/1995 | Dreste et al. |
| 5,396,371 A | 3/1995 | Henits et al. |
| 5,432,715 A | 7/1995 | Shigematsu et al. |
| 5,465,286 A | 11/1995 | Clare et al. |
| 5,475,625 A | 12/1995 | Glaschick |
| 5,485,569 A | 1/1996 | Goldman et al. |
| 5,491,780 A | 2/1996 | Fyles et al. |
| 5,499,291 A | 3/1996 | Kepley |
| 5,535,256 A | 7/1996 | Maloney et al. |
| 5,572,652 A | 11/1996 | Robusto et al. |
| 5,577,112 A | 11/1996 | Cambray et al. |
| 5,590,171 A | 12/1996 | Howe et al. |
| 5,597,312 A | 1/1997 | Bloom et al. |
| 5,619,183 A | 4/1997 | Ziegra et al. |
| 5,696,906 A | 12/1997 | Peters et al. |
| 5,717,879 A | 2/1998 | Moran et al. |
| 5,721,842 A | 2/1998 | Beasley et al. |
| 5,742,670 A | 4/1998 | Bennett |
| 5,748,499 A | 5/1998 | Trueblood |
| 5,778,182 A | 7/1998 | Cathey et al. |
| 5,784,452 A | 7/1998 | Carney |
| 5,790,798 A | 8/1998 | Beckett, II et al. |
| 5,796,952 A | 8/1998 | Davis et al. |
| 5,809,247 A | 9/1998 | Richardson et al. |
| 5,809,250 A | 9/1998 | Kisor |
| 5,825,869 A | 10/1998 | Brooks et al. |
| 5,835,572 A | 11/1998 | Richardson, Jr. et al. |
| 5,862,330 A | 1/1999 | Anupam et al. |
| 5,864,772 A | 1/1999 | Alvarado et al. |
| 5,884,032 A | 3/1999 | Bateman et al. |
| 5,907,680 A | 5/1999 | Nielsen |
| 5,918,214 A | 6/1999 | Perkowski |
| 5,923,746 A | 7/1999 | Baker et al. |
| 5,933,811 A | 8/1999 | Angles et al. |
| 5,944,791 A | 8/1999 | Scherpbier |
| 5,948,061 A | 9/1999 | Merriman et al. |
| 5,958,016 A | 9/1999 | Chang et al. |
| 5,964,836 A | 10/1999 | Rowe et al. |
| 5,978,648 A | 11/1999 | George et al. |
| 5,982,857 A | 11/1999 | Brady |
| 5,987,466 A | 11/1999 | Greer et al. |
| 5,990,852 A | 11/1999 | Szamrej |
| 5,991,373 A | 11/1999 | Pattison et al. |
| 5,991,796 A | 11/1999 | Anupam et al. |
| 6,005,932 A | 12/1999 | Bloom |
| 6,009,429 A | 12/1999 | Greer et al. |
| 6,014,134 A | 1/2000 | Bell et al. |
| 6,014,647 A | 1/2000 | Nizzari et al. |
| 6,018,619 A | 1/2000 | Allard et al. |
| 6,035,332 A | 3/2000 | Ingrassia et al. |
| 6,038,544 A | 3/2000 | Machin et al. |
| 6,039,575 A | 3/2000 | L'Allier et al. |
| 6,057,841 A | 5/2000 | Thurlow et al. |
| 6,058,163 A | 5/2000 | Pattison et al. |
| 6,061,798 A | 5/2000 | Coley et al. |
| 6,072,803 A * | 6/2000 | Allmond et al. ............ 370/445 |
| 6,072,860 A | 6/2000 | Kek et al. |
| 6,076,099 A | 6/2000 | Chen et al. |
| 6,078,894 A | 6/2000 | Clawson et al. |
| 6,091,712 A | 7/2000 | Pope et al. |
| 6,108,711 A | 8/2000 | Beck et al. |
| 6,122,665 A | 9/2000 | Bar et al. |
| 6,122,668 A | 9/2000 | Teng et al. |
| 6,130,668 A | 10/2000 | Stein |
| 6,138,139 A | 10/2000 | Beck et al. |
| 6,144,991 A | 11/2000 | England |
| 6,146,148 A | 11/2000 | Stuppy |
| 6,151,622 A | 11/2000 | Fraenkel et al. |
| 6,154,771 A | 11/2000 | Rangan et al. |
| 6,157,808 A | 12/2000 | Hollingsworth |
| 6,171,109 B1 | 1/2001 | Ohsuga |
| 6,182,094 B1 | 1/2001 | Humpleman et al. |
| 6,195,679 B1 | 2/2001 | Bauersfeld et al. |
| 6,201,948 B1 | 3/2001 | Cook et al. |
| 6,211,451 B1 | 4/2001 | Tohgi et al. |
| 6,225,993 B1 | 5/2001 | Lindblad et al. |
| 6,230,197 B1 | 5/2001 | Beck et al. |
| 6,236,977 B1 | 5/2001 | Verba et al. |
| 6,244,758 B1 | 6/2001 | Solymar et al. |
| 6,282,548 B1 | 8/2001 | Burner et al. |
| 6,286,030 B1 | 9/2001 | Wenig et al. |
| 6,286,046 B1 | 9/2001 | Bryant |
| 6,288,753 B1 | 9/2001 | DeNicola et al. |
| 6,289,340 B1 | 9/2001 | Purnam et al. |
| 6,301,462 B1 | 10/2001 | Freeman et al. |
| 6,301,573 B1 | 10/2001 | McIlwaine et al. |
| 6,324,282 B1 | 11/2001 | McIlwaine et al. |
| 6,347,374 B1 | 2/2002 | Drake et al. |
| 6,351,467 B1 | 2/2002 | Dillon |
| 6,353,851 B1 | 3/2002 | Anupam et al. |
| 6,360,250 B1 | 3/2002 | Anupam et al. |
| 6,370,547 B1 | 4/2002 | House et al. |
| 6,404,857 B1 | 6/2002 | Blair et al. |
| 6,411,989 B1 | 6/2002 | Anupam et al. |
| 6,418,471 B1 | 7/2002 | Shelton et al. |
| 6,459,787 B2 | 10/2002 | McIlwaine et al. |
| 6,487,195 B1 | 11/2002 | Choung et al. |
| 6,493,758 B1 | 12/2002 | McLain |
| 6,502,131 B1 | 12/2002 | Vaid et al. |
| 6,510,220 B1 | 1/2003 | Beckett, II et al. |
| 6,535,909 B1 | 3/2003 | Rust |
| 6,542,602 B1 | 4/2003 | Elazer |
| 6,546,405 B2 | 4/2003 | Gupta et al. |
| 6,560,328 B1 | 5/2003 | Bondarenko et al. |
| 6,583,806 B2 | 6/2003 | Ludwig et al. |
| 6,606,657 B1 | 8/2003 | Zilberstein et al. |
| 6,665,644 B1 | 12/2003 | Kanevsky et al. |
| 6,674,447 B1 | 1/2004 | Chiang et al. |
| 6,683,633 B2 | 1/2004 | Holtzblatt et al. |
| 6,697,858 B1 | 2/2004 | Ezerzer et al. |
| 6,721,284 B1 | 4/2004 | Mottishaw et al. |
| 6,724,887 B1 | 4/2004 | Eilbacher et al. |
| 6,725,366 B1 | 4/2004 | Swanberg |
| 6,728,345 B2 | 4/2004 | Glowny et al. |
| 6,738,456 B2 | 5/2004 | Wrona et al. |
| 6,751,297 B2 * | 6/2004 | Nelkenbaum ............ 379/88.13 |
| 6,757,361 B2 | 6/2004 | Blair et al. |
| 6,772,396 B1 | 8/2004 | Cronin et al. |
| 6,775,377 B2 | 8/2004 | McIlwaine et al. |
| 6,785,515 B1 | 8/2004 | Sommer et al. |
| 6,792,575 B1 | 9/2004 | Samaniego et al. |
| 6,810,414 B1 | 10/2004 | Brittain |
| 6,820,083 B1 | 11/2004 | Nagy et al. |
| 6,823,384 B1 | 11/2004 | Wilson et al. |
| 6,870,916 B2 | 3/2005 | Henrikson et al. |
| 6,901,438 B1 | 5/2005 | Davis et al. |
| 6,937,706 B2 | 8/2005 | Bscheider et al. |
| 6,959,078 B1 | 10/2005 | Eilbacher et al. |
| 6,965,886 B2 | 11/2005 | Govrin et al. |
| 7,305,082 B2 | 12/2007 | Elazar et al. |
| 2001/0000962 A1 | 5/2001 | Rajan |
| 2001/0032335 A1 | 10/2001 | Jones |
| 2001/0043697 A1 | 11/2001 | Cox et al. |
| 2002/0035616 A1 | 3/2002 | Diamond et al. |
| 2002/0038363 A1 | 3/2002 | MacLean |
| 2002/0052948 A1 | 5/2002 | Baudu et al. |
| 2002/0065911 A1 | 5/2002 | Von Klopp et al. |
| 2002/0065912 A1 | 5/2002 | Catchpole et al. |
| 2002/0075880 A1 * | 6/2002 | Dolinar et al. ............ 370/401 |
| 2002/0128925 A1 | 9/2002 | Angeles |
| 2002/0143925 A1 | 10/2002 | Pricer et al. |
| 2002/0165954 A1 | 11/2002 | Eshghi et al. |
| 2003/0055883 A1 | 3/2003 | Wiles et al. |
| 2003/0079020 A1 | 4/2003 | Gourraud et al. |

| | | | |
|---|---|---|---|
| 2003/0144900 | A1 | 7/2003 | Whitmer |
| 2003/0154240 | A1 | 8/2003 | Nygren et al. |
| 2004/0083099 | A1* | 4/2004 | Scarano et al. ............... 704/231 |
| 2004/0100507 | A1 | 5/2004 | Hayner et al. |
| 2004/0165717 | A1 | 8/2004 | McIlwaine et al. |
| 2005/0018622 | A1 | 1/2005 | Halbraich et al. |
| 2005/0013560 | A1 | 6/2005 | Lee et al. |
| 2006/0187957 | A1 | 8/2006 | Devine et al. |
| 2006/0203807 | A1 | 9/2006 | Kouretas et al. |
| 2007/0136399 | A1* | 6/2007 | Safstrom et al. ............ 707/204 |
| 2008/0004035 | A1 | 1/2008 | Atkins et al. |
| 2008/0212571 | A1 | 9/2008 | Ilan et al. |
| 2008/0285590 | A1* | 11/2008 | Mizuno et al. ............... 370/466 |
| 2009/0016522 | A1* | 1/2009 | Torres et al. ........... 379/265.06 |

FOREIGN PATENT DOCUMENTS

| | | |
|---|---|---|
| EP | 0773687 A2 | 5/1997 |
| EP | 0989720 | 3/2000 |
| GB | 2369263 | 5/2002 |
| GB | 2369263 A | 5/2002 |
| WO | WO 98/43380 | 11/1998 |
| WO | WO 00/16207 | 3/2000 |

OTHER PUBLICATIONS

"DKSystems Integrates QM Perception with OnTrack for Training," Web page, unvereified print date of Apr. 1, 2002, unverified cover date of Jun. 15, 1999.

"OnTrack Online" Delivers New Web Functionality, Web page, unverified print date of Apr. 2, 2002, unverified cover date of Oct. 5, 1999.

"PriceWaterouseCoopers Case Study" The Business Challenge, Web page, unverified cover date of 2000.

Abstract, net.working: "An Online Webliography," *Technical Training* pp. 4-5 (Nov.-Dec. 1998).

Adams et al., "Our Turn-of-the-Century Trend Watch" *Technical Training* pp. 46-47 (Nov./Dec. 1998).

Barron, "The Road to Performance: Three Vignettes," *Technical Skills and Training* pp. 12-14 (Jan. 1997).

Bauer, "Technology Tools: Just-in-Time Desktop Training is Quick, Easy, and Affordable," *Technical Training* pp. 8-11 (May/Jun. 1998).

Beck et al., "Applications of A1 in Education," *AMC Crossroads* vol. 1: 1-13 (Fall 1996) Web page, unverified print date of Apr. 12, 2002.

Benson and Cheney, "Best Practices in Training Delivery," *Technical Training* pp. 14-17 (Oct. 1996).

Bental and Cawsey, "Personalized and Adaptive Systems for Medical Consumer Applications," Communications ACM 45(5): 62-63 (May 2002).

Benyon and Murray, "Adaptive Systems: from intelligent tutoring to autonomous agents," pp. 1-52, Web page, unknown date.

Blumenthal et al., "Reducing Development Costs with Intelligent Tutoring System Shells," pp. 1-5, Web page, unverified print date of Apr. 9, 2002, unverified cover date of Jun. 10, 1996.

Brusilosy et al., "Distributed intelligent tutoring on the Web," Proceedings of the 8th World Conference of the AIED Society, Kobe, Japan, Aug. 18-22, pp. 1-9 Web page, unverified print date of Apr. 12, 2002, unverified cover date of Aug. 18-22, 1997.

Brusilovsky and Pesin, ISIS-Tutor: An Intelligent Learning Environment for CD/ISIS Users, @ pp. 1-15 Web page, unverified print date of May 2, 2002.

Brusilovsky, "Adaptive Educational Systems on the World-Wide-Web: A Review of Available Technologies," pp. 1-10, Web Page, unverified print date of Apr. 12, 2002.

Byrnes et al., "The Development of a Multiple-Choice and True-False Testing Environment on the Web," pp. 1-8, Web page, unverified print date of Apr. 12, 2002, unverified cover date of 1995.

Calvi and DeBra, "Improving the Usability of Hypertext Courseware through Adaptive Linking," *ACM*, unknown page numbers (1997).

Coffey, "Are Performance Objectives Really Necessary?" *Technical Skills and Training* pp. 25-27 (Oct. 1995).

Cohen, "Knowledge Management's Killer App," pp. 1-11, Web page, unverified print date of Sep. 12, 2002, unverified cover date of 2001.

Cole-Gomolski, "New Ways to manage E-Classes," *Computerworld* 32(48):4344 (Nov. 30, 1998).

Cross: "Sun Microsystems—the SunTAN Story," Internet Time Group 8 (© 2001).

Cybulski and Linden, "Teaching Systems Analysis and Design Using Multimedia and Patterns," unknown date, unknown source.

De Bra et al., "Adaptive Hypermedia: From Systems to Framework," *ACM* (2000).

De Bra, "Adaptive Educational Hypermedia on the Web," *Communications ACM* 45(5):60-61 (May 2002).

Dennis and Gruner, "Computer Managed Instruction at Arthur Andersen & Company: A Status Report," *Educational Technical* pp. 7-16 (Mar. 1992).

Diessel et al., "Individualized Course Generation: A Marriage Between CAL and ICAL," *Computers Educational* 22(1/2) 57-65 (1994).

Dyreson, "An Experiment in Class Management Using the World-Wide Web," pp. 1-12, Web page, unverified print date of Apr. 12, 2002.

E Learning Community, "Excellence in Practice Award: Electronic Learning Technologies," *Personal Learning Network* pp. 1-11, Web page, unverified print date of Apr. 12, 2002.

Eklund and Brusilovsky, "The Value of Adaptivity in Hypermedia Learning Environments: A Short Review of Empirical Evidence," pp. 1-8, Web page, unverified print date of May 2, 2002.

*e-Learning the future of learning*, THINQ Limited, London, Version 1.0 (2000).

Eline, "A Trainer's Guide to Skill Building," *Technical Training* pp. 34-41 (Sep./Oct. 1998).

Eline, "Case Study: Briding the Gap in Canada's IT Skills," *Technical Skills and Training* pp. 23-25 (Jul. 1997).

Eline "Case Study: IBT's Place in the Sun," *Technical Training* pp. 12-17 (Aug./Sep. 1997).

Fritz, "CB templates for productivity: Authoring system templates for trainers," *Emedia Professional* 10(8):6678 (Aug. 1997).

Fritz, "ToolBook II: Asymetrix's updated authoring software tackles the Web," *Emedia Professional* 10(20): 102106 (Feb. 1997).

Gibson et al., "A Comparative Analysis of Web-Based Testing and Evaluation Systems," pp. 1-8, Web page, unverified print date of Apr. 11, 2002.

Halberg and DeFiore, "Curving Toward Performance: Following a Hierarchy of Steps Toward a Performance Orientation," *Technical Skills and Training* pp. 9-11 (Jan. 1997).

Harsha, "Online Training 'Sprints' Ahead," *Technical Training* pp. 27-29 (Jan./Feb. 1999).

Heideman, "Training Technicians for a High-Tech Future: These six steps can help develop technician training for high-tech work," pp. 11-14 (Feb./Mar. 1995).

Heideman, "Writing Performance Objectives Simple as A-B-C (and D)," *Technical Skills and Training* pp. 5-7 (May/Jun. 1996).

Hollman, "Train Without Pain: The Benefits of Computer-Based Training Tools," pp. 1-11, Web page, unverified print date of Mar. 20, 2002, unverified cover date of Jan. 1, 2000.

Klein, "Command Decision Training Support Technology," Web page, unverified print date of Apr. 12, 2002.

Koonce, "Where Technology and Training Meet," *Technical Training* pp. 10-15 (Nov./Dec. 1998).

Kursh, "Going the distance with Web-based training," *Training and Development* 52(3): 5053 (Mar. 1998).

Larson, "Enhancing Performance Through Customized Online Learning Support," *Technical Skills and Training* pp. 25-27 (May/Jun. 1997).

Linton, et al. "OWL: A Recommender System for Organization-Wide Learning," *Educational Technical Society* 3(1): 62-76 (2000).

Lucadamo and Cheney, "Best Practices in Technical Training," *Technical Training* pp. 21-26 (Oct. 1997).

McNamara, "Monitoring Solutions: Quality Must be Seen and Heard," *Inbound/Outbound* pp. 66-67 (Dec. 1989).

Merrill, "The New Component Design Theory: Instruction design for courseware authoring," *Instructional Science* 16:19-34 (1987).

Minton-Eversole, "IBT Training Truths Behind the Hype," *Technical Skills and Training* pp. 15-19 (Jan. 1997).

Mizoguchi, "Intelligent Tutoring Systems: The Current State of the Art," Trans. IEICE E73(3):297-307 (Mar. 1990).
Mostow and Aist, "The Sounds of Silence: Towards Automated Evaluation of Student Learning a Reading Tutor that Listens" *American Association for Artificial Intelligence*, Web page, unknown date Aug. 1997.
Mullier et al., "A Web base Intelligent Tutoring System," pp. 1-6, Web page, unverified print date of May 2, 2002.
Nash, Database Marketing, 1993, pp. 158-165, 172-185, McGraw Hill, Inc. USA.
Nelson et al. "The Assessment of *End-User Training Needs*," *Communications ACM* 38(7):27-39 (Jul. 1995).
O'Herron, "CenterForce Technologies' CenterForce Analyzer," Web page unverified print date of Mar. 2, 2002, unverified cover date of Jun. 1, 1999.
O'Roark, "Basic Skills Get a Boost," Technical Training pp. 10-13 (Jul./Aug. 1998).
Pamphlet, On Evaluating Educational Innovations[1], authored by Alan Lesgold, unverified cover date of Mar. 5, 1998.
Papa et al., "A Differential Diagnostic Skills Assessment and Tutorial Tool," *Computer Education* 18(1-3):45-50 (1992).
PCT International Search Report, International Application No. PCT/US03/02541, mailed May 12, 2003.
Phaup, "New Software Puts Computerized Tests on the Internet: Presence Corporation announces breakthrough Question Mark™ Web Product," Web page, unverified print date of Apr. 1, 2002.
Phaup, "QM Perception™ Links with Integrity Training's WBT Manager™ to Provide Enhanced Assessments of Web-Based Courses," Web page, unverified print date of Apr. 1, 2002, unverified cover date of Mar. 25, 1999.
Phaup, "Question Mark Introduces Access Export Software," Web page, unverified print date of Apr. 2, 2002, unverified cover date of Mar. 1, 1997.
Phaup, "Question Mark Offers Instant Online Feedback for Web Quizzes and Questionnaires: University of California assist with Beta Testing, Server scripts now available on high-volume users," Web page, unverified print date of Apr. 1, 2002, unverified cover date of May 6, 1996.
Piskurich, Now-You-See-'Em, Now-You-Don't Learning Centers, *Technical Training* pp. 18-21 (Jan./Feb. 1999).
Read, "Sharpening Agents' Skills," pp. 1-15, Web page, unverified print date of Mar. 20, 2002, unverified cover date of Oct. 1, 1999.
Reid, "On Target: Assessing Technical Skills," *Technical Skills and Training* pp. 6-8 (May/Jun. 1995).
Stormes, "Case Study: Restructuring Technical Training Using ISD," *Technical Skills and Training* pp. 23-26 (Feb./Mar. 1997).
Tennyson, "Artificial Intelligence Methods in Computer-Based Instructional Design," Journal of Instructional Development 7(3): 17-22 (1984).
The Editors, Call Center, "The Most Innovative Call Center Products We Saw in 1999," Web page, unverified print date of Mar. 20, 2002, unverified cover date of Feb. 1, 2000.
Tinoco et al., "Online Evaluation in WWW-based Courseware," *ACM* pp. 194-198 (1997).
Uiterwijk et al., "The virtual classroom," *InfoWorld* 20(47):6467 (Nov. 23, 1998).
Unknown Author, "Long-distance learning," *InfoWorld* 20(36):7676 (1998).
Untitled, 10th Mediterranean Electrotechnical Conference vol. 1 pp. 124-126 (2000).
Watson and Belland, "Use of Learner Data in Selecting Instructional Content for Continuing Education," *Journal of Instructional Development* 8(4):29-33 (1985).
Weinschenk, "Performance Specifications as Change Agents," *Technical Training* pp. 12-15 (Oct. 1997).
Witness Systems promotional brochure for eQuality entitled "Bringing eQuality to Business".
Witness Systems promotional brochure for eQuality entitled "Building Customer Loyalty Through Business-Driven Recording of Multimedia Interactions in your Contact Center," (2000).
Aspect Call Center Product Specification, "Release 2.0", Aspect Telecommuications Corporation, May 23, 1998 798.
Metheus X Window Record and Playback, XRP Features and Benefits, 2 pages Sep. 1994 LPRs.
"Keeping an Eye on Your Agents," Call Center Magazine, pp. 32-34, Feb. 1993 LPRs & 798.
Anderson: Interactive TVs New Approach, The Standard, Oct. 1, 1999.
Ante, *Everything You Ever Wanted to Know About Cryptography Legislation. . . (But Were to Sensible to Ask)*, PC world Online, Dec. 14, 1999.
Berst. *It's Baa-aack. How Interative TV is Sneaking Into Your Living Room*, The AnchorDesk, May 10, 1999.
Berst. *Why Interactive TV Won't Turn You On (Yet)*, The AnchorDesk, Jul. 13, 1999.
Borland and Davis. *US West Plans Web Services on TV*, CNETNews.com, Nov. 22, 1999.
Brown. *Let PC Technology Be Your TV Guide*, PC Magazine, Jun. 7, 1999.
Brown. *Interactive TV: The Sequel*, NewMedia, Feb. 10, 1998.
Cline. Déjà vu—*Will Interactive TV Make It This Time Around?*, DevHead, Jul. 9, 1999.
Crouch. *TV Channels on the Web*, PC World, Sep. 15, 1999.
D'Amico. *Interactive TV Gets$99 set-top box*, IDG.net, Oct. 6, 1999.
Davis. *Satellite Systems Gear Up for Interactive TV Fight*, CNETNews.com, Sep. 30, 1999.
Diederich. *Web TV Data Gathering Raises Privacy Concerns*, ComputerWorld, Oct. 13, 1998.
*Digital Broadcasting*, Interactive TV News.
*EchoStar, MediaX Mix Interactive Multimedia With Interactive Television*, PRNews Wire, Jan. 11, 1999.
Furger. *The Internet Meets the Couch Potato*, PCWorld, Oct. 1996.
*Hong Kong Comes First with Interactive TV*, Sci-Tech, Dec. 4, 1997.
*Interactive TV Overview TimeLine*, Interactive TV News.
*Interactive TV Wars Heat Up*, Industry Standard.
Needle. *Will the Net Kill Network TV?* PC World Online, Mar. 10, 1999.
Kane. *AOL-Tivo: You've Got Interactive TV*, ZDNN, Aug. 17, 1999.
Kay. *E-Mail in Your Kitchen*, PC World Online, 093/28/96.
Kenny. *TV Meets Internet*, PC World Online, Mar. 28, 1996.
Linderholm. *Avatar Debuts Home Theater PC*, PC World Online, Dec. 1, 1999.
Mendoza. *Order Pizza WhileYyou Watch*, ABCNews.com.
Moody. *WebTV: What the Big Deal?*, ABCNews.com.
Murdorf, et al. *Interactive Television—Is There Life After the Internet?*, Interactive TV News.
Needle. *PC, TV or Both?*, PC World Online.
*Interview with* Steve Perlman, CEO of Web-TV Networks, PC World Online.
Press. *Two Cultures, The Internet and Interactive TV*, Universite de Montreal.
Reuters. *Will TV Take Over Your PC?*, PC World Online.
Rohde. *Gates Touts Interactive TV*, InfoWorld, Oct. 14, 1999.
Ross. *Broadcasters Use TV Signals to Send Data*, PC World Oct. 1996.
Schlisserman. *Is Web TV a Lethal Weapon?*, PC World Online.
Stewart. *Interactive Television at Home: Television Meets the Internet*, Aug. 1998.
Swedlow. *Computer TV Shows: Ready for Prime Time?*, PC World Online.
Wilson. *U.S. West Revisits Interactive TV*, Interactive Week, Nov. 28, 1999.

* cited by examiner

FIG. 10

| + | BITS 0-3 | 4 – 7 | 8 - 15 | 16 – 18 | 19 – 31 |
|---|---|---|---|---|---|
| 0 | VERSION | HEADER LENGTH | TYPE OF SERVICE | TOTAL LENGTH | |
| 32 | IDENTIFICATION | | | FLAGS | FRAGMENT OFFSET |
| 64 | TIME TO LIVE | | PROTOCOL | HEADER CHECKSUM | |
| 96 | SOURCE ADDRESS (32 BITS) | | | | |
| 128 | DESTINATION ADDRESS (32 BITS) | | | | |
| 160 | OPTIONS | | | | |
| 160/192+ | DATA | | | | |

| VERSION (4 BITS) | TRAFFIC CLASS (8 BITS) | FLOW LABEL (20 BITS) | |
|---|---|---|---|
| PAYLOAD (16 BITS) | | NEXT HEADER (8 BITS) | HOP LIMIT (8 BITS) |
| SOURCE ADDRESS (128 BITS) | | | |
| DESTINATION ADDRESS (128 BITS) | | | |

1103

SYSTEMS AND METHODS FOR CAPTURING MULTIMEDIA COMMUNICATION SIGNALS

TECHNICAL FIELD

The present disclosure is generally related to recording various types of communication signals.

BACKGROUND

Call centers typically record interactions between employees and between employees and customers to monitor quality of performance. Typically, recording components used for such recording are specific to the types of interactions. For example, a company that records time division multiplexing (TDM) audio has a TDM recorder. If that company also records IP audio, the company also has an IP recorder that is separate and independent from the TDM recorder. In addition, if that company would like to record agent desktop screen, the company would need a screen capture recorder that is also separate and independent from the TDM and IP recorders. Each separate and independent recorder is operative to only receive and record a single specific type of interaction.

Typically, a company has multiple servers that are the source of information to the recorder. The recorder uses the information to determine whether to record the corresponding types of interactions. The multiple servers include, but are not limited to, computer-telephone integration (CTI) servers, customer relationship management (CRM) servers, e-mail servers, dialers, and session initiation protocol (SIP) proxy servers, for example. Typically, these servers may be integrated to different independent recorders. Each recorder is limited to the information provided by its respective server. In addition, analytical applications that evaluate the performance of a call center communicate with the recorders to access the various types of desirable recorded interactions. Hence, accessing a deployment of hybrid recorders can be difficult and may need different applications and hardware devices.

Currently, many companies use a 32-bit address scheme as part of their communication network, which limits the address space to 4,294,967,296 possible unique addresses.

SUMMARY OF THE INVENTION

Systems and methods for capturing communication signals are provided. An exemplary method comprises the steps of: receiving communication signals of various types; determining whether to record the received communication signals; responsive to determining that the received communication signals are to be recorded; determining types of communication signals associated with the received communication signals; responsive to determining the types of communication signals; determining multiple interfaces that facilitate recording of the communication signals; and recording the communication signals via the corresponding multiple interfaces.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 10 illustrates an exemplary structure of a 32-bit packet header.

FIG. 11 illustrates an exemplary structure of a 128-bit packet header.

DETAILED DESCRIPTION OF THE PREFERRED EMBODIMENT

Disclosed herein are systems and methods for capturing communication signals. In particular, embodiments of such a system incorporate a recording system that includes multiple interfaces that facilitate receiving and recording of various types of communication signals. The recording system can be deployed at a centralized location, e.g., within a company premises, and/or embedded into a network as a service on the network and/or as intelligence in the network infrastructure.

Figure 1:
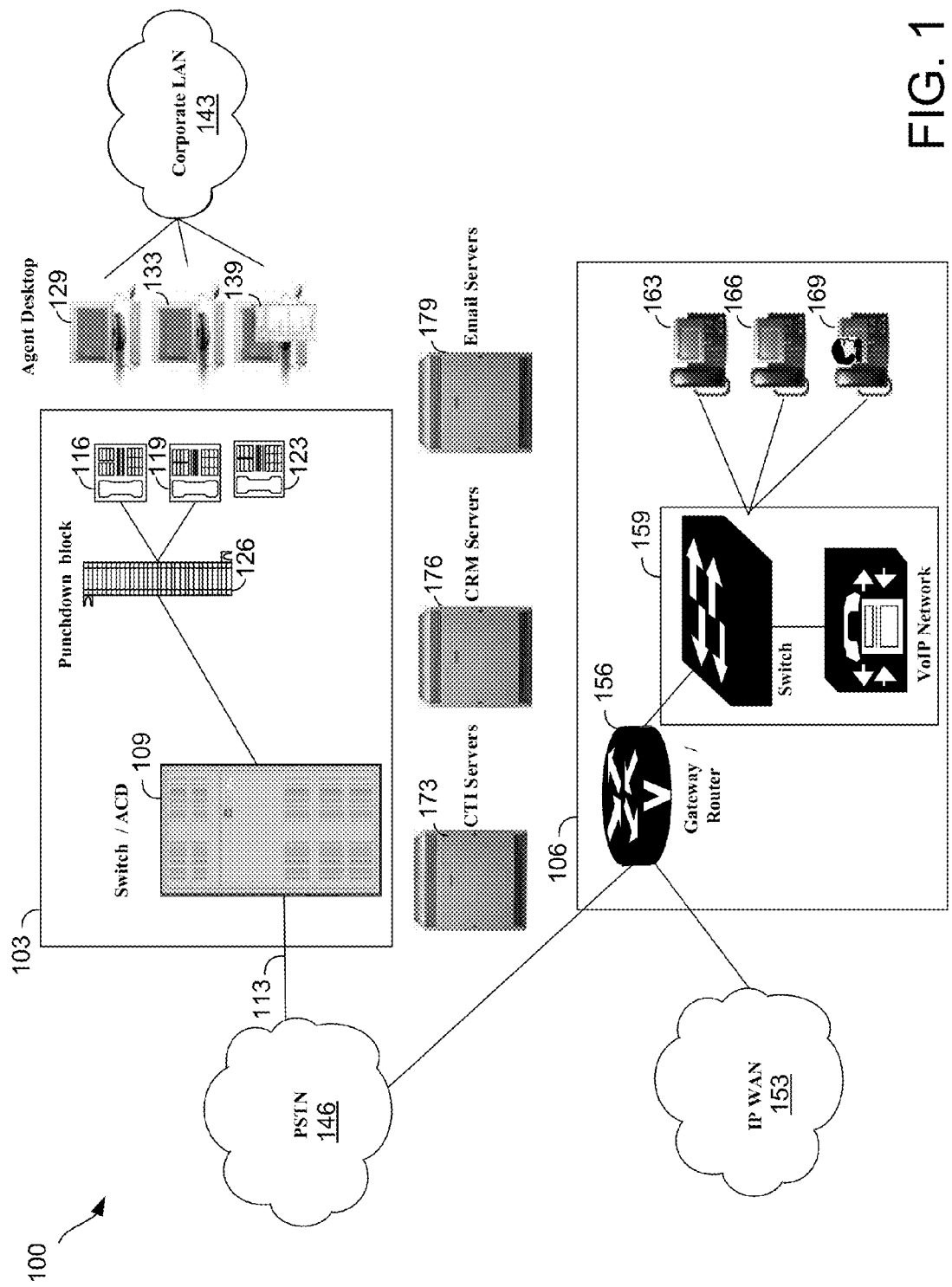
FIG. 1 is a schematic diagram of an embodiment of a communications network.

FIG. 1 is a schematic diagram of an embodiment of a communications network. The company premises 100 includes a telephony system 103 and a voice over IP (VOIP) system 106. The telephony system 103 receives communication signals by way of a switch 109 (or automatic call distributor "ACD") via line 113. The switch 109 can distribute incoming communication signals to one or more telephones 116, 119, 123 via a punchdown block 126. The telephones may be coupled to desktops 129, 133, 139 that communicate with the telephones. In addition, the desktops 129, 133, 139 can be coupled to a corporate LAN 143, which enables the desktops to communicate with each other or other computers outside the company premises 100. The telephony system 103 is connected to a public switch telephone network (PSTN) 146 and can transmit outgoing communication signals using the PSTN 146.

A Voice over Internet Protocol (VoIP) system 106 can be connected to the PSTN 146. The VoIP system 106 receives and transmits communication signals via gateway/router 156. If the gateway 156 receives the communication signals from the PSTN 146, the gateway 156 converts the communication signals to digital communication signals. Additionally or alternatively, the gateway 156 can receive digital communication signals from an Internet Protocol Wide Area Network (IP WAN) 153. In either or both situations, the gateway 156 sends the digital communication signals to a VoIP network/switch 159, which distributes the signal to VoIP phones 163, 166, 169.

Figure 2:
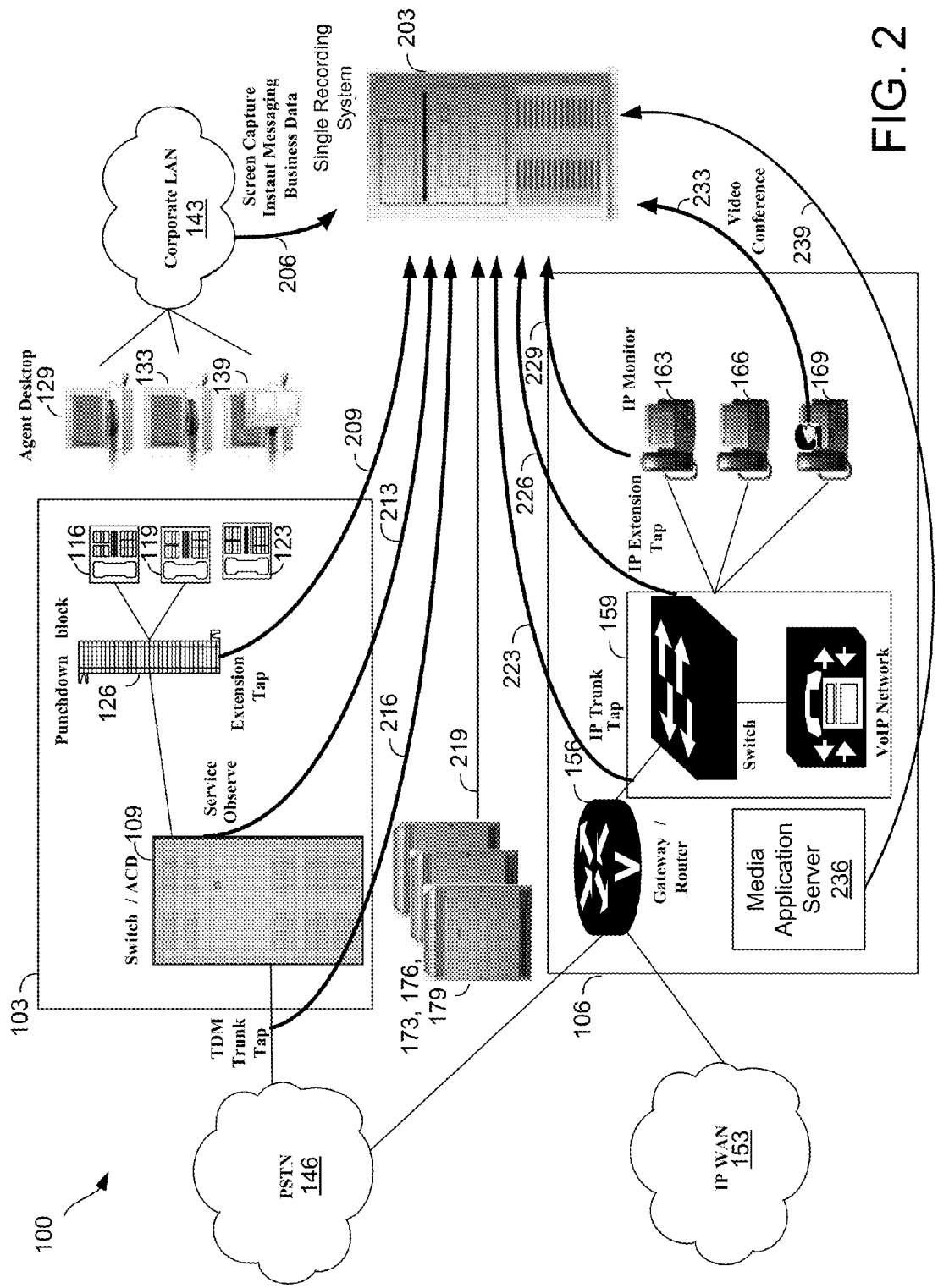
FIG. 2 is a schematic diagram of an embodiment of a company premises having a communications network using a recording system to record various types of communication signals.

FIG. 2 is a schematic diagram of an embodiment of a communications network using a recording system to record various types of communication signals. The recording system 203 can be a single recording server or a cluster of recording servers, for example. The recording system 203 can receive various types of communication signals from the communication network and store the communication signals in an allocated resource (not shown). The recording system 203 can receive and store, for example, data 206 from the agent desktops 129, 133, 139, such as screen capture, instant message, and business data through the corporate LAN 143; audio data 209 from the punchdown block 126 by way of extension taps; service observation data 213 from the switch/ACD 109; communication data 216 between the switch 109 and PSTN 146 by way of TDM truck taps; IP data 223 between the gateway 156 and the VoIP Network/switch 159 by way of IP trunk taps; IP data 226 from the switch by way of IP extension taps; IP data 229 from IP phones 163, 166 by way of IP monitoring, media data 239 from the media application server 236, and video conference data 233 from the IP phone 169. Additionally or alternatively, the recording system 203 can receive and store communication signals in either 32-bit or 128-bit scheme, or both.

The recording system 203 can further receive various types of external contact center events 219 from the multiple servers 173, 176, 179. The recording system enables continued use of the multiple servers 173, 176, 179 by receiving the various types of external contact center events 219 and determine whether to record communication signals based on the received events. Additionally or alternatively, the recording system 203 can receive and store data from media servers with recorder capabilities ("media server/recorder"). The recording system 203 includes interfaces that communicate with the media servers/recorder to manage the data stored in the media server/recorder, such as archive, data management, and search and mine. In other words, the recording system 203 can integrate with the media server/recorder as a cluster of subsystems. Additionally or alternatively, the recording system 203 receives and stores data stored in the media server/recorder.

Figure 3:
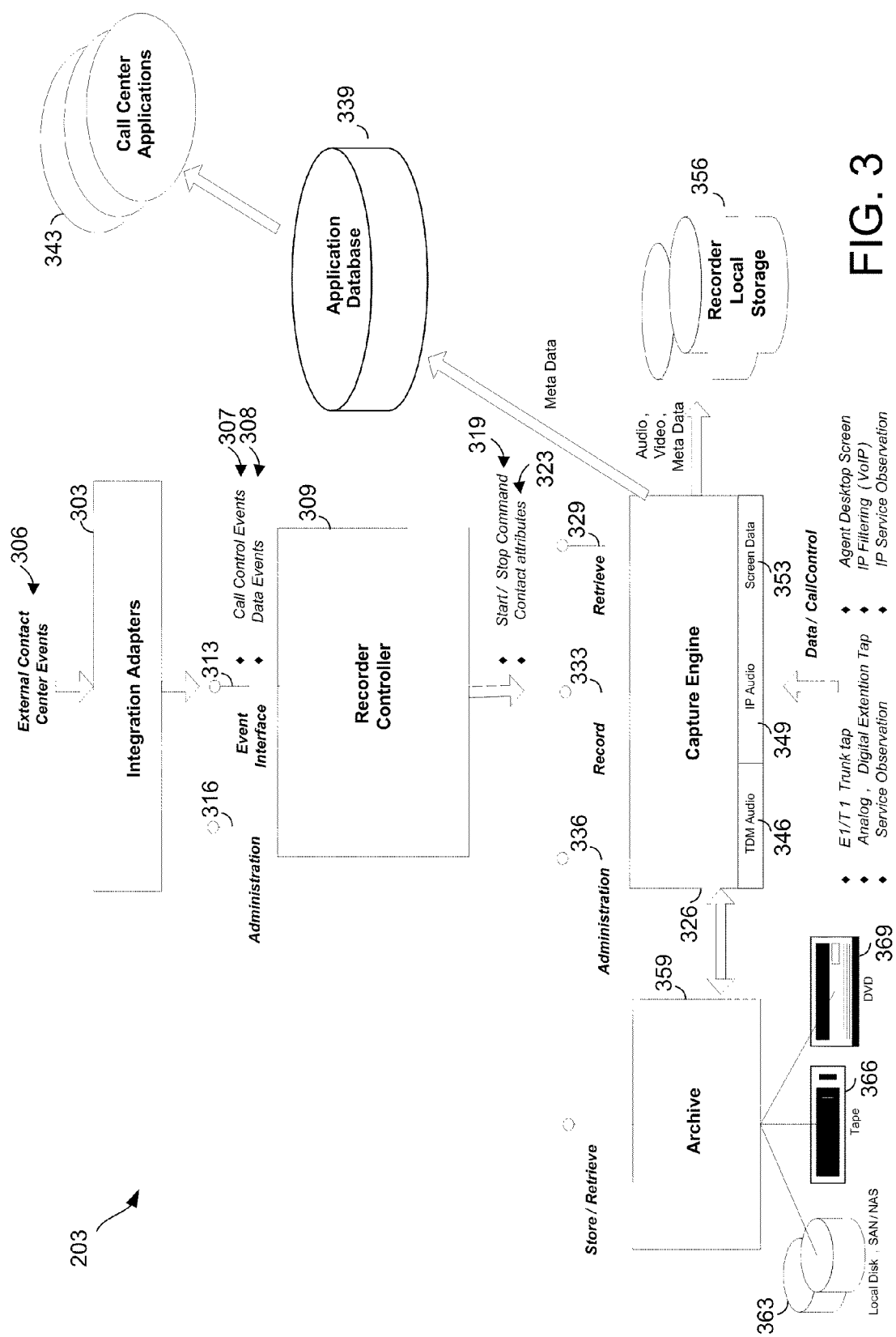
FIG. 3 is a block diagram of an embodiment of a recording system, such as shown in FIG. 2.

FIG. 3 is a block diagram of an embodiment of a recording system, such as shown in FIG. 2. The recording system 203 includes integration adapters 303 that communicate with the multiple servers 173, 176, and 179. The integration adapters 303 receive external events (and/or custom attributes), such as call control events 307 and data events 308. The integration adapters 303 pass the external contact center events to a recorder controller 309, which determines whether to record communication signals based on the external contact center events 306.

An event interface application 313 of the recording controller 309 receives the external contact center events. An administration application 316 of the recording controller 309 processes the external contact center events 306. After the processing is completed, the recorder controller 309 determines whether to record corresponding communication signals associated with the external contact center events 306. If the recorder controller 309 determines to record the corresponding communication signals, the recorder controller 309 transmits start/stop commands 319 and contact attributes 323 to a capture engine 326 or an archive 359. The recorder controller 309 can selectively record one to one hundred percent of the communication signals. The recorder controller 309 can use a business rule engines (not shown) to further selectively record audio/video that prioritizes events above random recordings. The recorder controller 309 can record on demand, allocate optimum recording of a media channel, and monitor post-call activities.

Retrieve, record and administration applications 329, 333, 336 of the capture engine 326 receive and process the commands 319 and attributes 323 from the recorder controller 309. Specifically, the retrieve application 329 facilitates retrieving stored communication signals (e.g., meta data) from the capture engine 326 and transmitting the meta data to an application enterprise datastore 339. Call center applications 343 can access the information in the datastore 339 for analysis and optimization of the performance of the call center.

The record application 333 instructs the capture engine 326 to start/stop recording communication signals that the capture engine 326 receives from various types of communication interfaces. The communication interfaces facilitate receiving and storing TDM audio 346, IP audio 349, screen data 353, IM chat (not shown), e-mail (not shown), video conference (not shown), and/or other multimedia data. The communication interfaces also facilitates tapping into the switches of the network (e.g., extension taps, TDM trunk taps, IP trunk taps, and IP extension taps) and communicating with the soft phones 163, 166, 169 and media server 236 to receive communication signals. The capture engine 326 can transmit audio, video, and meta data to a recorder local storage 356. The capture engine 326 is a single platform with extendable interface types. The capture engine 326 has as many as 336 concurrent channels and is self-sufficient in a closed box with fault tolerance feature, minimum connection lost, and passive tap sense driven recording.

Additionally or alternatively, the recorder controller 309 can instruct the capture engine 326 to transmit stored communication signals to the archive 359 and instruct the archive 359 to store the communication signals to a local disk 363, tape 366, and DVD 369. The recorder controller 309 can further instruct the archive 359 to retrieve stored communication signals from the local disk 363, tape 366, and DVD 369. The archive 359 then transmits the stored communication signals to the capture engine 326, which transmits the signals to a desirable location. The archive 359 has a fault-tolerant storage of contact data and meta data. The archive 359 can manage multiple local storage media or integrate to a third party server. The archive 359 further supports the retrieval of contact data for playback applications.

Figure 4:
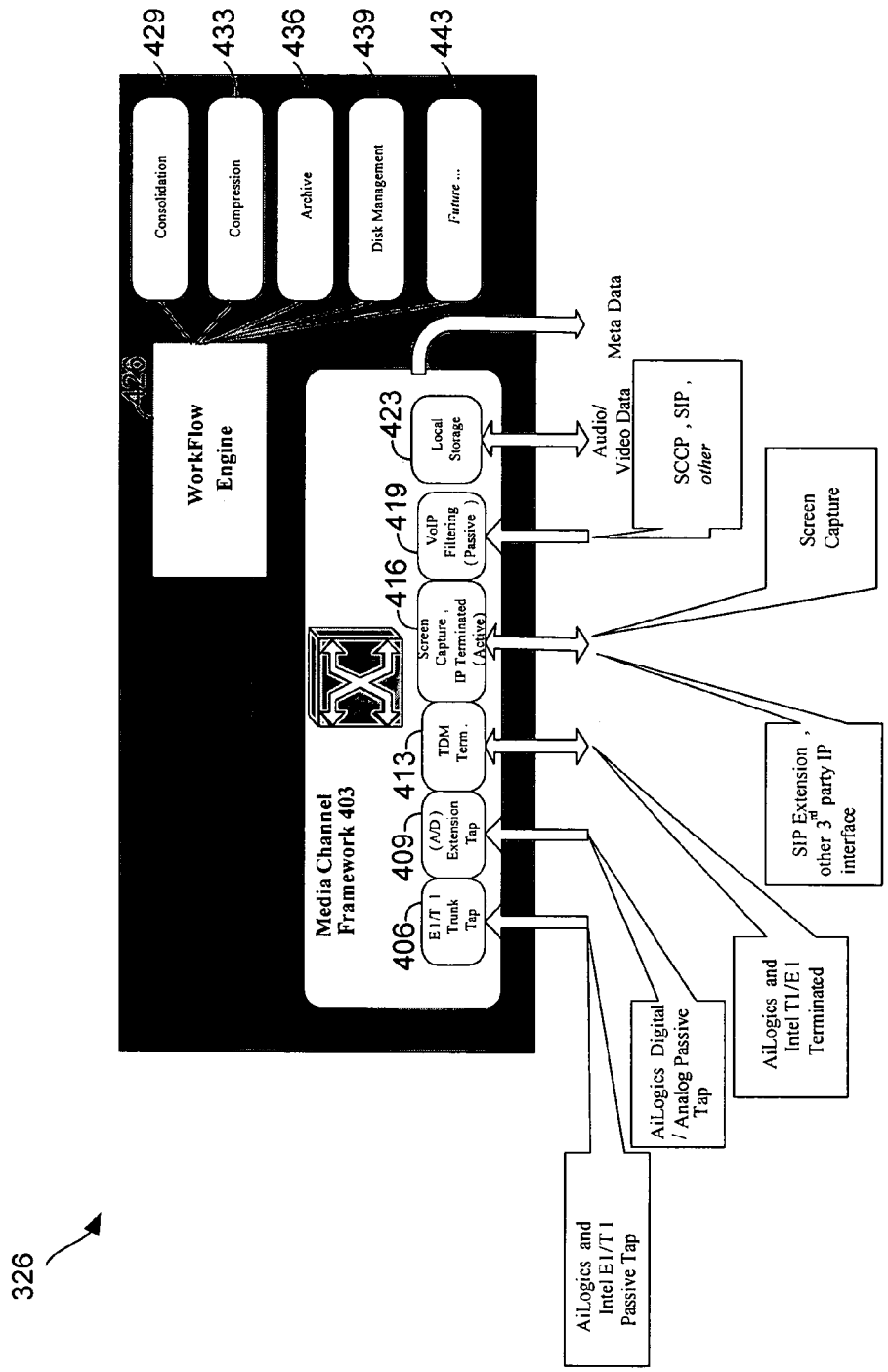
FIG. 4 is a block diagram of an embodiment of a capture engine, such as shown in FIG. 3.

FIG. 4 is a block diagram of an embodiment of a capture engine, such as shown in FIG. 3. The capture engine 326 consolidates receiving and recording various types of communication signals into a recording system. In some embodiments, the capture engine 326 includes various types of communication interfaces that facilitate receiving and recording various types of communication signals. For example, the capture engine 326 includes a media channel framework 403 which includes an E1/T1 trunk tap interface 406, A/D extension tap interface 409, TDM terminated interface 413, screen capture interface 416, voice over IP (VoIP) filter interface 419 and local storage interface 423. The E1/T1 trunk tap interface 406 can communicate with an AiLogics and Intel E1/T1 tap; the A/D extension tap interface 409 can communicate with an AiLogics digital/analog passive tap; and the TDM terminated interface 413 can communicate with an AiLogics and Intel E1/T1 terminated. The screen capture interface 416 can communicate with software running on the agent's desktop; the IP Terminated interface can communicate with an SIP extension; the VoIP filtering interface 419 can decode with a SCCP, SIP, or other similar protocol; and network cards (not shown) can receive 32-bit and 128-bit communication format.

The local storage interface 423 receives and stores audio/video data in a storage medium. The media channel framework 403 further outputs meta data to call center applications 343 for optimization of call centers or other applications that utilize the stored communication signals. The capture engine 326 further includes a workflow engine 426 that processes consolidation 429, compression 433, archive 436, disk management 439, and other processes of stored data in the capture engine 326. The capture engine 326 is capable of content segment recording, which can support content level security at an application layer.

A company premises may have a hybrid environment that includes both communication devices operative to communicate with signals with 32-bit or 128-bit packet header, such as 32-bit and 128-bit soft phones, gateways, routers, recording system, and switches, for example. In particular, the recording system includes the TDM terminated interface 413, IP terminated interface 416, and VoIP filtering 419 that can receive and record the communication signals.

Figure 5:
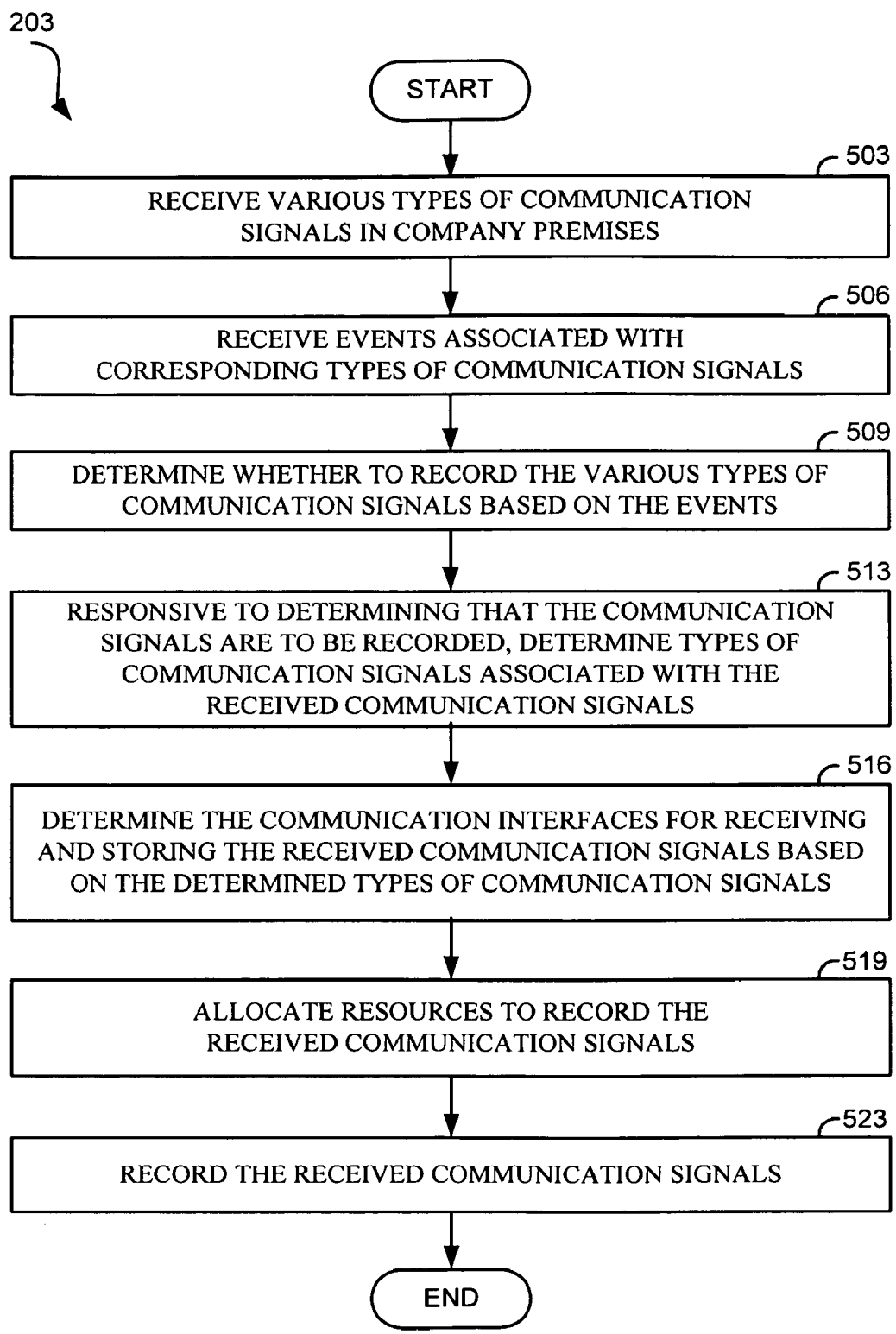
FIG. 5 is a flow diagram that illustrates operation of an embodiment of a recording system that receives and records various types of communication signals.

FIG. 5 is a flow diagram that illustrates operation of an embodiment of a recording system that receives and records various types of communication signals. Beginning with block 503, the recording system receives various types of communication signals in a company premises. As mentioned above, the recording system uses the various types of communication interfaces for receiving corresponding types of communications. For example, the capture engine can use the E1/T1 trunk tap interface 406, extension tap interface 409 and TDM terminated interface 413 to record TDM communication signals.

In block 506, the recording system receives external contact center events associated with corresponding types of communication signals in the company premises. In block 509, the recording system determines whether to record the various types of communication signals based on the events. In block 513, responsive to determining that the communication signals are to be recorded, the recording system determines the types of communication signals associated with the received communication signals. In block 516, the recording system determines the communication interfaces for receiving and storing the received communication signals based on the determined types of communication signals. In block 519, the recording system allocates resources to record the received communication signals. In block 523, the recording system records the received communication signals via the determined communication interfaces.

In some embodiments, various applications are able to access and analyze all the various types of communication signals in the company premises in a recording system with one repository. This reduces steps that would otherwise be present if the various types of communication signals are recorded in multiple recording systems. For example, if two types of communication signals are recorded in the recording system instead of two servers, then applications that analyze the two types of the communication signals can communicate, access, and search in one recording system instead of two recording systems.

Figure 6:
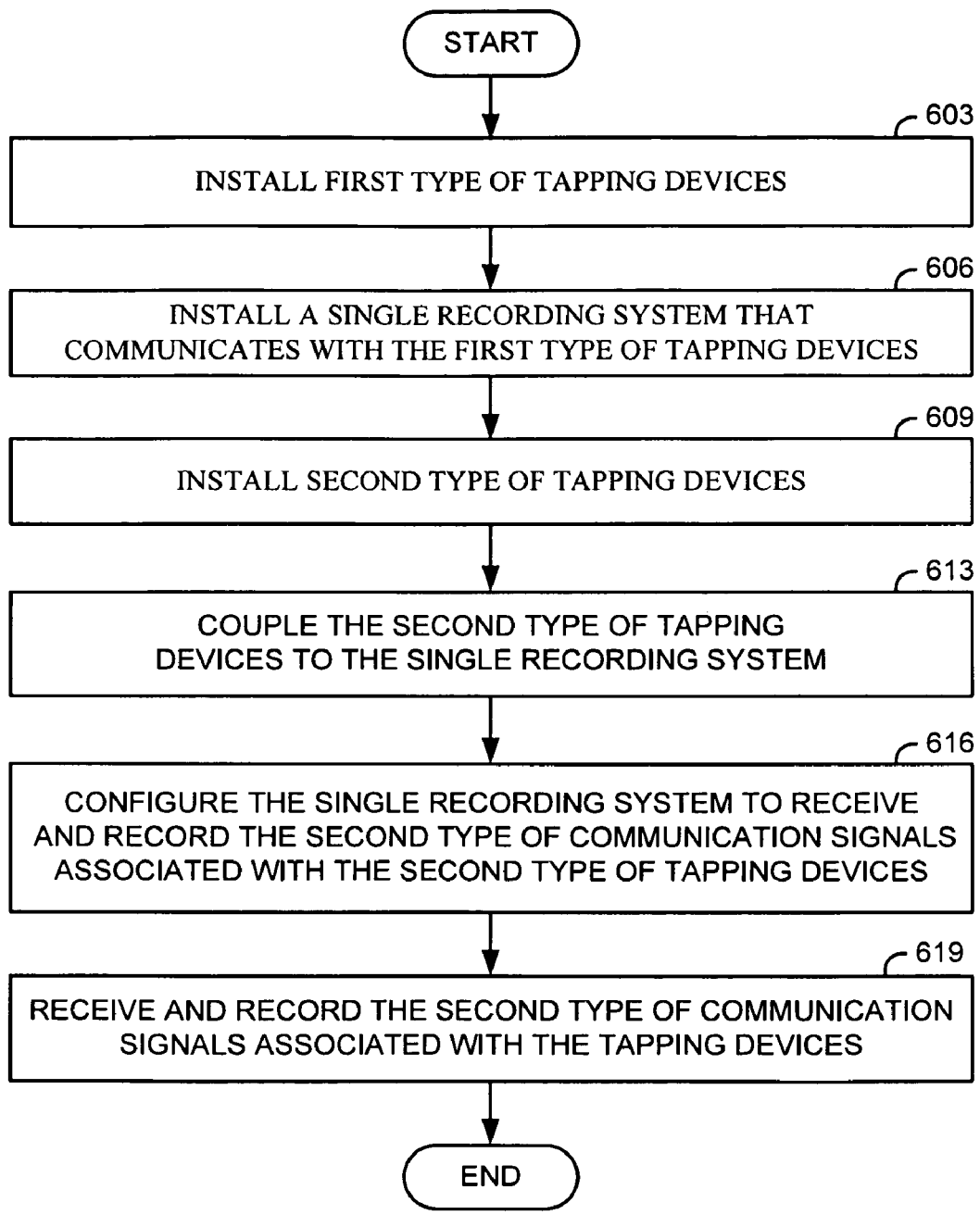
FIG. 6 is a flow diagram that illustrates operation of an embodiment of a recording system that enables a company to record from an existing to an advanced type of communication signals.

FIG. 6 is a flow diagram that illustrates operation of an embodiment of a recording system that enables a company to record first and second types of communication signals. In block 603, a company installs a first type of tapping devices, e.g., extension tap and TDM trunk tap, to obtain and record a first type of communication signals, e.g., TDM communication signals, between employees and between employees and customers. In block 606, the company installs an embodiment of a recording system that operates to receive and record the first type of communication signals from the first type of tapping devices. In block 609, the company installs a second type of tapping devices to obtain a second type of communication signals, such as service observation data from an ACD. In block 613, the second type of tapping devices is coupled to the recording system. In block 616, the recording system is configured to receive and record the second type of communication signals associated with the second type of tapping devices. In block 619, the single recording device can automatically receive and record the second type of communication signals without using a separate recording system.

Theoretically, the recording system can have various interfaces to receive and record $N^{th}$ types of communication signals in case the company installs corresponding $N^{th}$ types of tapping devices. In this regard, the recording system can obtain $N^{th}$ types of tap points to receive and record the $N^{th}$ types of communication signals. As mentioned above, other types of communication signals with which some embodiments of a recording system can operate include, for example, screen capture, instant message, and business data 206 from the agent desktops 129, 133, 139 through the corporate LAN 143 and service observation data 213 from the switch/ACD 109. Other types of communication signals further include IP data 223 between the gateway 156 and the call manager/switch 159 by way of IP trunk taps and IP data 226 from the switch by way of IP extension taps. In addition, other types of communication signals include IP data 229 from IP phones 163, 166 by way of IP monitoring, media data 239 from the media application server 236, and video conference data 233 from the IP phone 169, as shown in FIG. 2. Alternatively or additionally, some embodiments of a recording system can record communication signals with a 32-bit address, 64-bit, or 128-bit address.

Theoretically, the company can transition to $N^{th}$ (generally more advanced) types of communication signals using the recording system without using a separate and independent system. That is, the company does not need to install a separate recording system to record the $N^{th}$ types of communication signals. For example, this is particularly useful when the company transitions from an 32-bit to an 128-bit address environment. The recording system may already have the interfaces that support receiving and recording the 32-bit and 128-bit address communication signals.

Another potential advantage can occur when a company installs an advance communication platform. For example, the company upgrades from a TDM communication platform to an IP communication platform (or to any other advanced multimedia platform). The single recording device can receive and record various types of communication signals in either the TDM or IP communication platforms, or both. The recording system can be an integrated recording platform and can include 10-10,000 concurrent recording channels that support receiving and recording the various types of communication signals.

Figure 7:
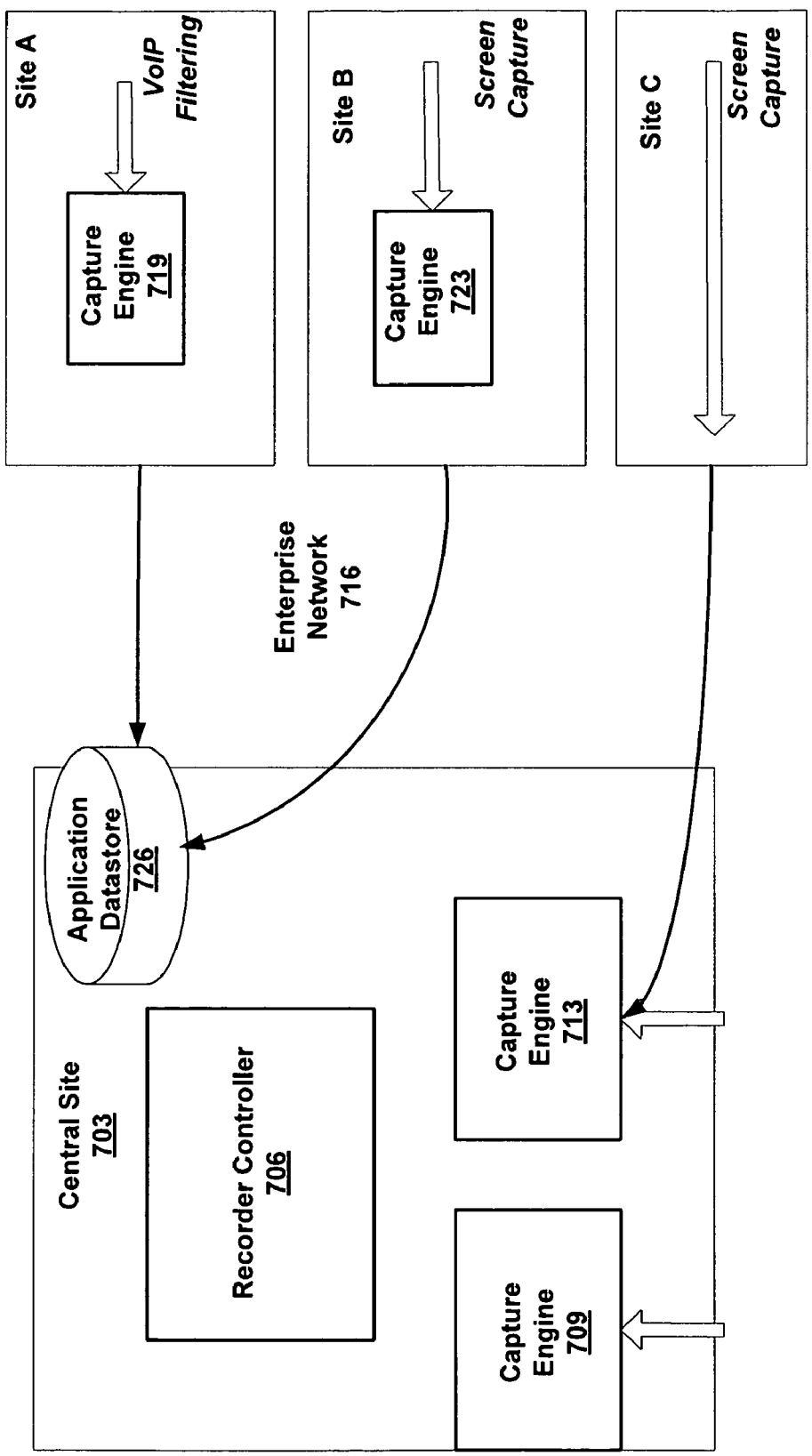
FIG. 7 is a block diagram of an embodiment of a system that illustrates multiple capture engines at multiple sites of a company premises.

FIG. 7 is a block diagram of an embodiment of a system that illustrates multiple capture engines at multiple sites of a company premises. The multiple capture engines can store various types of communication signals in one repository, for example, such as in an application datastore 726. A central site 703 has a recorder controller 706 that controls two capture engines 709, 713. The central site 703 communicates with sites A, B, and C through enterprise network 716. The sites A and B have their own capture engines 719, 723, respectively. The capture engine 719 in site A receives and stores communication signals associated with VoIP filtering. Site C is capable of transmitting screen capture data to the capture engine 713 in the central site 703. The capture engine 723 in site B receives and stores communication signals associated with the screen capture. The capture engines 709, 713, 719, 723 of the company premises store their received various types of communication signals in the application datastore 726.

Figure 8:
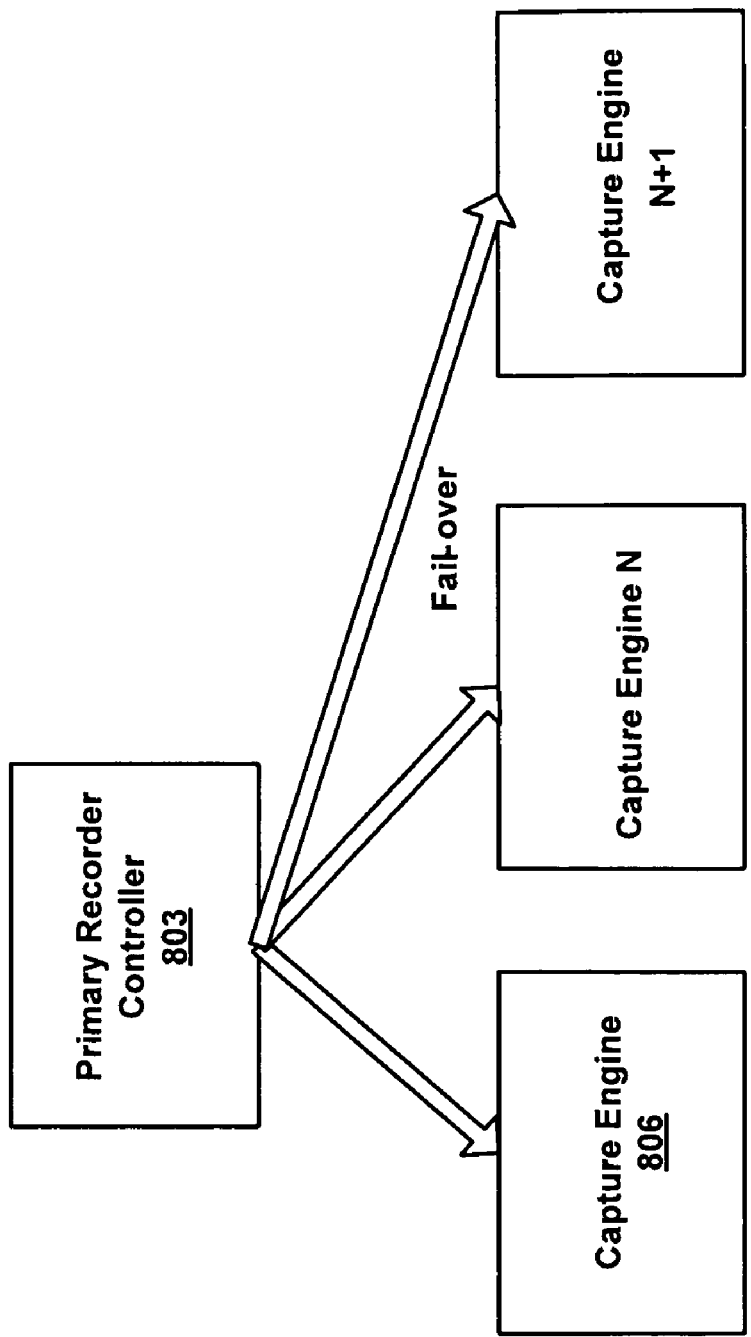
FIG. 8 a block diagram of an embodiment of a fail-over system that illustrates a recorder controller communicating with multiple capture engines.

FIG. 8 a block diagram of an embodiment of a fail-over system that illustrates a recorder controller communicating with multiple capture engines. The fail-over system includes a primary recorder controller 803 that communicates with capture engine 806, capture engine N, and capture engine N+1. The primary recorder controller 803 communicates with the capture engine 803, but if the capture engine 803 fails, then the primary recorder controller 803 has the capability of communicating with the capture engine N. If the recorder controller 803 fails to communicate with the capture engine 803 and capture engine N, the primary recorder controller 803 can communicate with the capture engine N+1. This enables the fail-over system to record communication signals if a capture engine fails.

Figure 9:
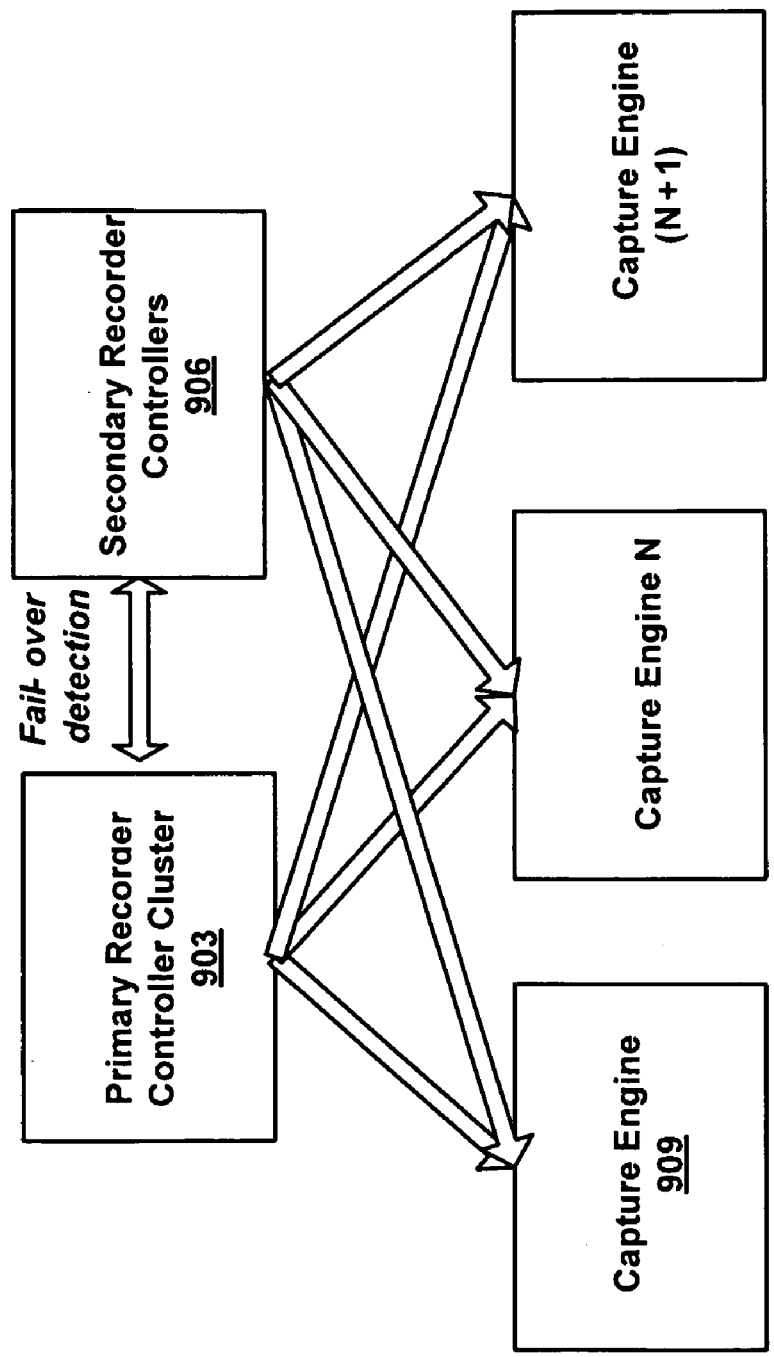
FIG. 9 is a block diagram of an embodiment of a system that illustrates recorder controllers in a fail-over detection situation.

FIG. 9 is a block diagram of an embodiment of a fail-over detection system that illustrates two recorder controllers each communicating with each other and communicating with multiple capture engines. The fail-over detection system includes a primary recorder controller cluster 903 and secondary recorder controller 906. Each controller is connected to the multiple capture engines 909, N, N+1. The primary recorder controller cluster 903 communicates with secondary recorder controller 906. Operations and applications of the primary recorder controller cluster 903 can be stored in secondary recorder controller 906 in case the cluster 903 malfunctions, or vice versa. For example, if the primary recorder controller cluster 903 malfunctions, the secondary controller 906 can take over and resume operation as if the malfunctioning controller 903 never malfunctioned.

FIG. 10 illustrates an exemplary structure of a 32-bit address packet header. The 32-bit address packet header 1003 includes a version field, a head length field, type of service field, total length field, identification field, flags field, fragment offset field, time to live field, protocol field, header checksum field, source address field, destination address field, option field, and data field. The 32-bit source and destination addresses are 32-bit IP addresses.

FIG. 11 illustrates an exemplary structure of a 128-bit address packet header. The 128-bit address packet header 1103 includes a version field, a traffic class field, flow label field, payload field, next header field, hop limit field, source address field, and destination address field. The 128-bit source and destination addresses are 128-bit IP addresses. An exemplary operation of the 32-bit address and 128-bit address communication devices is described in relation to FIG. 12. An exemplary operation of an embodiment of a recording system that receives and records the 32-bit address and 128-bit address communication signals is described in relation to FIG. 13.

Figure 12:
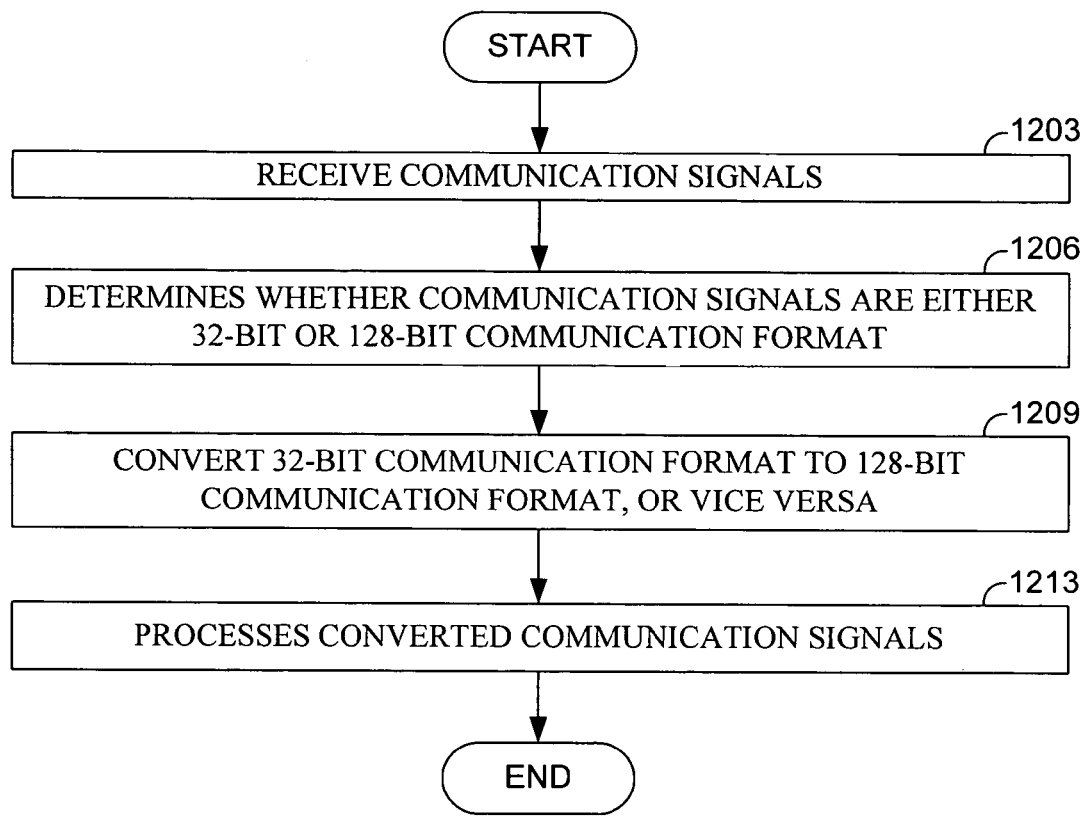
FIG. 12 is a flow diagram that illustrates operation of an embodiment of a communication device that receives communication signals with a 32-bit or 128-bit address, or both.

FIG. 12 is a flow diagram that illustrates operation of an embodiment of a communication device that receives either 32-bit or 128-bit communication signals, or both. The 32-bit or 128-bit communication device can include, but is not limited to, 32-bit and 128-bit address soft phones, gateways, routers, recording system, and switches. In block 1203, the communication device receives the 32-bit or 128-bit communication signals. In block 1206, the communication device determines whether the communication signals are either 32-bit or 128-bit communication format. In block 1209, if the 32-bit communication format is determined, the communication device can convert the 32-bit communication format to 128-bit communication format, or vice versa. In block 1213, the communication device processes the converted communication signals according to its functionality.

Figure 13:
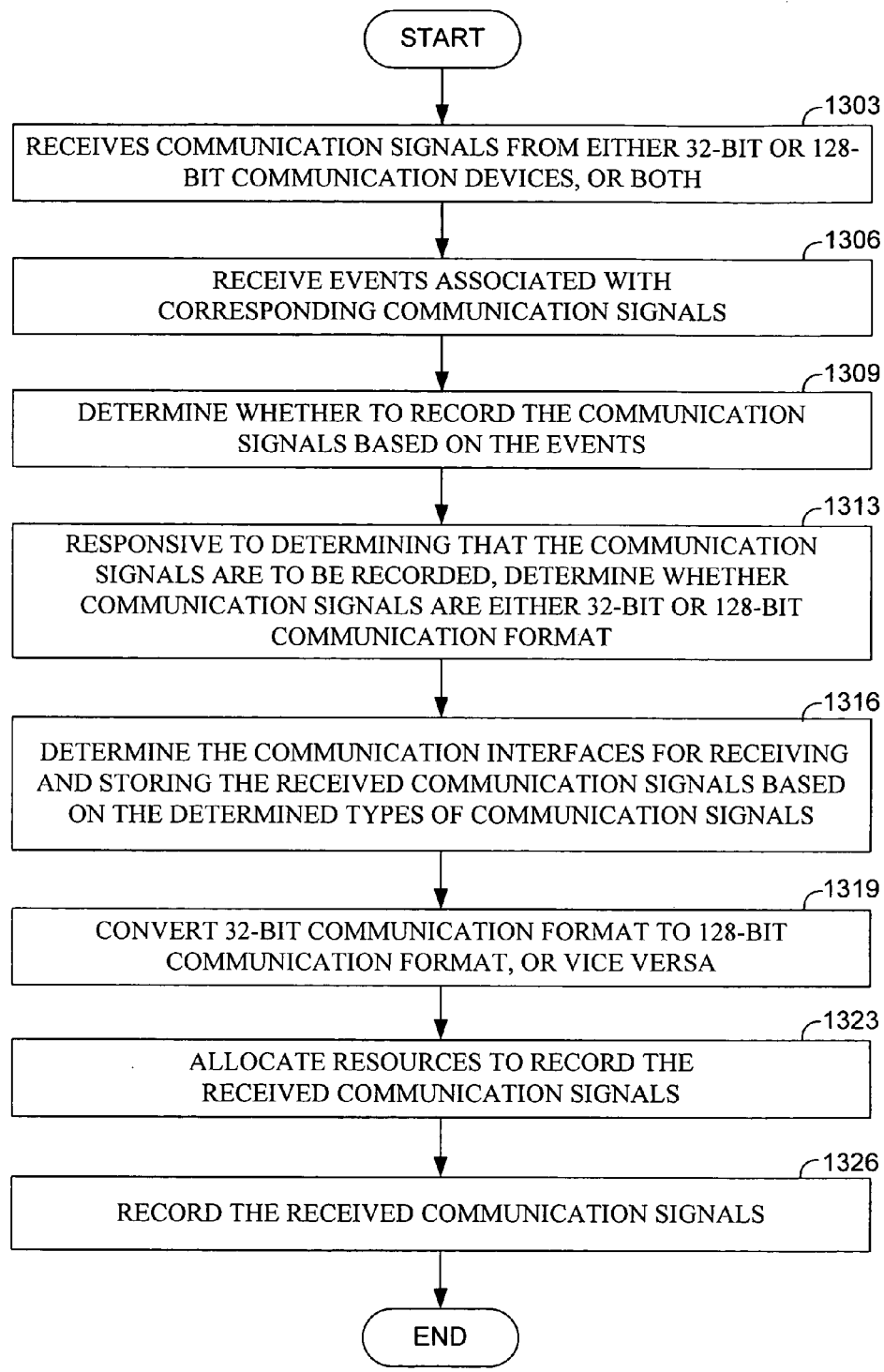
FIG. 13 is a flow diagram that illustrates operation of an embodiment of a recording system that receives and records communication signals with a 32-bit or 128-bit header packet, or both.

FIG. 13 is a flow diagram that illustrates operation of an embodiment of a recording system that receives and records 32-bit or 128-bit communication signals. In block 1303, the recording system receives communication signals from either 32-bit or 128-bit communication devices, or both, via communication interfaces of the recording system. In block 1306, the recording system receives external contact center events associated with the 32-bit and/or 128-bit communication signals. In block 1309, the recording system determines whether to record the 32-bit and/or 128-bit communication signals based on the events.

In block 1313, responsive to determining that the communication signals are to be recorded, the recording system determines whether the communication signals are either 32-bit or 128-bit communication format. In block 1316, the recording system determines the communication interfaces for receiving and storing the received communication signals based on the determined types of communication signals. In blocks 1319 and 1323, the recording system allocates resources to record the received communication signals and converts the 32-bit communication format to the 128-bit communication format, or vice versa. In block 1326, the recording system records the received communication signals via the determined communication interfaces.

Figure 14:
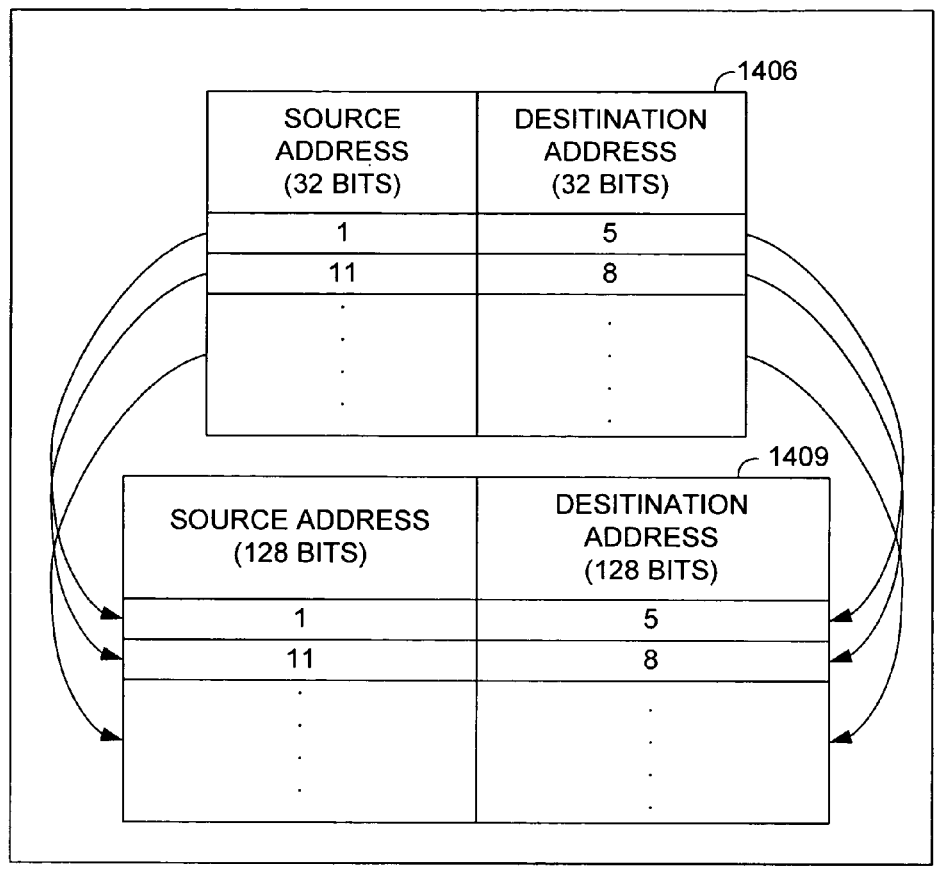
FIG. 14 illustrates an embodiment of look-up tables that a recording system could use to identify IP communication devices.

An example of a conversion of 32-bit and 128-bit communication signals is converting the 32-bit source and destination addresses into 128-bit source and destination addresses. FIG. 14 illustrates an embodiment of look-up tables that a recording system can use to identify IP communication devices. Look-up tables 1406, 1409 include lists of source and destination addresses of the 32-bit and 128-bit communication device, respectively. For example, the recording system may need to convert 128-bit source and destination addresses into 128-bit source and destination addresses. Once the single recording device determines that the communication signals are in 32-bit format, the single recording device uses the look-up tables 1406, 1409 to convert the 32-bit addresses to 128 bit addresses.

Figure 15:
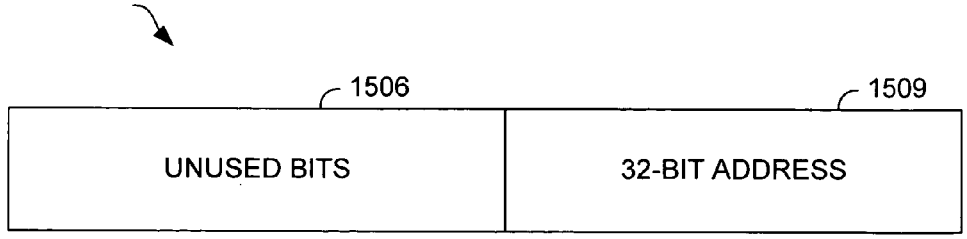
FIG. 15 illustrates an embodiment of a 128-bit address converted from a 32-bit address.

Additionally or alternative, the single recording device can include a translation application (not shown) that converts 32-bit address to 128-bit communication format, or vice versa. For example, once the single recording device determines that the communication signals are in 32-bit format, the single recording device uses the translation application to convert the 32-bit addresses to 128 bit addresses, such as shown in FIG. 15. The translation application can insert the 32-bit address in a 32-bit section 1509 of a 128-bit address 1503. A 96-bit section 1506 of the 128-bit address 1503 is unused and can be a string of zeros, for example. Alternatively or additionally, the 96-bit section 1506 can include 80 zeros (0's) and 16 ones (1's).

In some embodiments, the recording system has the capability to transition a company from using an existing communication system to an advanced communication system. For example, if a company wants to transition from using a traditional TDM telephony technology to a VoIP technology, then the recording system can continue to record telephony communication signals and begin to record VoIP communication signals. The company can record in a hybrid environment of the telephony and VoIP technologies using the recording system. Alternatively, the company can completely transition to record VoIP technology. In addition, the recording system can record multimedia communication signals if the company later decides to use multimedia technology. The company does not need to purchase another system to handle the various types of communication signals. Applications that utilize the recorded communication signals to for example, analyze the optimization of the contact center can access the recorded communication signals from the recording system and continue to function in the same manner. Also, retrieval ability of the recordings from both previous method of recording and new method or recording is seamless. This is added value to the company that is not provided in the industry at this time.

It should be emphasized that the above-described embodiments are merely possible examples of implementations, merely set forth for a clear understanding of the principles of the invention. Many variations and modifications may be made to the above-described embodiments without departing substantially from the spirit and principles of the invention. All such modifications and variations are intended to be included herein within the scope of this disclosure and the present invention and protected by the following claims.

Therefore, having thus described the invention, at least the following is claimed:

1. A system for capturing communication signals, comprising:
   a recorder controller operative to determine whether to record communication signals of various types and to transmit control signals that include instructions to record the communication signals;
   an archive system operative to store the communication signals in a database; and
   a capture engine operative to receive the control signals and to receive the communication signals, further comprising
   wherein the capture engine includes multiple interfaces operative to facilitate receiving and recording the communication signals,
   wherein the capture engine is further operative to:
   determine whether to record the received communication signals based on the control signals,
   responsive to determining that the received communication signals are to be recorded, determine types of communication signals associated with the received communication signals;
   responsive to determining the types of communication signals, determine the multiple interfaces that facilitate recording of the communication signals; and
   record the communication signals via the determined multiple interfaces,
   wherein the multiple interfaces include trunk tap, extension tap, TDM terminated, IP terminated, and VoIP filtering interfaces.

2. The system as defined in 1, further comprising integration adapters operative to receive external call contact events associated with the communication signals, the integration adapters being operative to transmit the external call contact events to the recording controller.

3. The system as defined in claim 2, wherein the recorder controller determines whether to record the communication signals based on the external call contact events.

4. The system as defined in claim 1, wherein the multiple interfaces include 32-bit and 128-bit communication interfaces.

5. A recording system that captures a plurality of communication signals, comprising:
   integration adapters that receive external call contact events associated with a plurality of communication signals;
   a recorder controller operative to receive the external call contact events and determine whether to record the plurality of communication signals based on the external call contact events, the plurality of communication signals including various types of communication signals, the recording controller being further operative to transmit control signals based on the external call contact events, the control signals including instructions to record the plurality of communication signals;
   a capture engine operative to receive the plurality of communication signals and the control signals; and
   an archive system for storing the received corresponding plurality of communication signals,
   wherein the capture engine includes multiple interfaces that facilitate receiving and recording the plurality of communication signals,
   wherein the capture engine is further operative to:
   determine whether to record the received plurality of communication signals based on the control signals,
   responsive to determining that the received plurality of communication signals are to be recorded, determine types of communication signals associated with the received corresponding plurality of communication signals,
   responsive to determining the types of communication signals, determine the multiple interfaces that facilitate recording the received corresponding plurality of communication signals, and
   record the received plurality of communication signals in allocated resources via the determined multiple interfaces, wherein the multiple interfaces correspond to trunk tap, extension tap, TDM terminated, IP terminated, and VoIP filtering.

6. The system as defined in claim 5, wherein the multiple interfaces receive and record communication signals in one of 32-bit and 128-bit formats.

7. The system as defined in claim 5, further comprising a second recorder controller operative to communicate with the capture engine responsive to the recorder controller malfunctioning.

* * * * *